US011324157B2

(12) United States Patent
Peters

(10) Patent No.: US 11,324,157 B2
(45) Date of Patent: May 10, 2022

(54) METHOD FOR ASCERTAINING PLANT PROPERTIES OF A USEFUL PLANT

(71) Applicant: BASF SE, Ludwigshafen am Rhein (DE)

(72) Inventor: Ole Peters, Düsseldorf (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 635 days.

(21) Appl. No.: 16/307,967

(22) PCT Filed: Jun. 8, 2017

(86) PCT No.: PCT/EP2017/063954
§ 371 (c)(1),
(2) Date: Dec. 7, 2018

(87) PCT Pub. No.: WO2017/211948
PCT Pub. Date: Dec. 14, 2017

(65) Prior Publication Data
US 2019/0297771 A1    Oct. 3, 2019

(30) Foreign Application Priority Data

Jun. 9, 2016  (EP) .................................... 16173692

(51) Int. Cl.
*G01N 1/22* (2006.01)
*A01B 79/00* (2006.01)
*E21B 49/02* (2006.01)
*A01B 79/02* (2006.01)
*G01N 1/02* (2006.01)

(52) U.S. Cl.
CPC ............ *A01B 79/005* (2013.01); *A01B 79/02* (2013.01); *E21B 49/02* (2013.01); *G01N 1/2294* (2013.01); *G01N 2001/021* (2013.01)

(58) Field of Classification Search
CPC ....... A01B 79/005; A01B 79/02; E21B 49/02; G01N 1/2294; G01N 2001/021
See application file for complete search history.

(56) References Cited

U.S. PATENT DOCUMENTS

| 9,226,449 | B2 | 1/2016 | Bischoff |
| 9,301,446 | B2 | 4/2016 | Peters et al. |
| 10,007,640 | B2 | 6/2018 | Maidl |
| 2012/0109614 | A1* | 5/2012 | Lindores ............ G06K 9/00657 703/11 |
| 2017/0223947 | A1* | 8/2017 | Gall .................... G01N 21/4738 |
| 2018/0295771 | A1 | 10/2018 | Peters |

FOREIGN PATENT DOCUMENTS

| DE | 102008009753 B3 | 9/2009 |
| DE | 102011050877 A1 | 9/2012 |
| EP | 1483951 A1 | 12/2004 |
| EP | 2586286 A1 | 5/2013 |
| EP | 2764764 A1 | 8/2014 |
| WO | WO-2016025848 A1 | 2/2016 |

OTHER PUBLICATIONS

European Search Report for corrsponding EP Patent Application No. 16173692.1, 3 pages, dated Dec. 16, 2016.
Hoffmann et al., "Impact of Spatial Soil and Climate Input Data Aggregation on Regional Yield Simulations", PLOS One, vol. 11, Issue 4, pp. 1-123, 2016.
International Search Report for PCT/EP2017/063954 dated Nov. 23, 2017.
Written Opinion of the International Searching Authority for PCT/EP2017/063954 dated Nov. 23, 2017.

* cited by examiner

*Primary Examiner* — Xin Y Zhong
(74) *Attorney, Agent, or Firm* — Lowenstein Sandler LLP

(57) ABSTRACT

The invention relates to a method, a system and a computer program product for ascertaining a plant property of a useful plant in a field, wherein external data concerning the useful plant are stored in a memory unit, wherein a measurement device ascertains a raw measured value relating to at least one plant property, and wherein a calibrated or corrected value for the plant property is ascertained on the basis of the raw measured value taking account of the external data from the memory unit.

15 Claims, No Drawings

METHOD FOR ASCERTAINING PLANT PROPERTIES OF A USEFUL PLANT

CROSS-REFERENCE TO RELATED APPLICATIONS

This application is a national stage application (under 35 U.S.C. § 371) of PCT/EP2017/063954, filed Jun. 8, 2017, which claims benefit of European Application No, 16173692.1, filed Jun. 9, 2016, both of which are incorporated herein by reference in their entirety.

The invention, relates to a method, a system and a computer program product for ascertaining a plant property of a useful plant in a field.

In order to be able to achieve a maximal yield of the useful plant with low resource utilization, as precise as possible a knowledge of the state and the development of the useful plant is necessary, in order optionally to influence the growth process by suitable measures such as irrigation, nutrient supply and/or the application of pesticides. In this, it is found that through spatially or georeferenced differentiation of suitable measures, the resources can be particularly efficiently utilized. Accordingly, a large number of sensors and decision algorithms are known which propose a defined agricultural measure on the basis of the measurement results of the sensors.

For example, the research information system Agrar/Ernährung (FISA), an information portal of the German Federal Republic and its federal states, refers to a project performed by the Hohenheim University for the creation of a real time-capable measurement device for subarea-specific herbicide application. In this, the measurement device consists of several cameras with integrated image processing and object recognition and a control terminal. The cameras are fastened with side-arms on the frame of a field sprayer. During the travel through the crop area, the cameras take pictures continuously. The plants or plant parts recognizable in the picture each time are assessed and assigned to appropriate classifiers. Finally, by means of the algorithms for specific crop and application situations stored in the control terminal, it is decided in real time whether the field sprayer is activated at the particular position and what application quantity is necessary. Thus the whole area application of herbicides in the field crop is no longer necessary, rather the herbicides can now still be applied on actually weed-infested subareas only. However, there is a need to improve the measurement device for example as regards more robust recognition of plants in case of sometimes very diverse agricultural environments and conditions.

The Yara company supplies the so-called N sensor, which measures and analyzes the sunlight reflected from the plant crop. By simultaneous measurement of the directly incident sunlight, different light conditions are compensated. The light captured by the sensor is passed to a spectrometer, spectrally split and analyzed. In certain spectral bands, the reflective properties of the plant crop are influenced by the nitrogen nutritional state. Thus from the reflective properties the instantaneous nitrogen content and from this the future nitrogen requirement can be determined, however for this the N sensor requires a complicated calibration beforehand. Even when calibration has been performed, the N sensor only to a limited extent produces values useful for deciding what quantity of nitrogen is necessary for the further growth of the useful plant. If for example a second nitrogen application is to be made, then with the use of the N sensor the quantity of nitrogen still fractionally present in the soil from a first nitrogen application as a rule remains unconsidered. On the basis of the measurement results of the N sensor, too high an application quantity is then ascertained for a second nitrogen application. This shows that the assessment of measurement results and their use as a basis for agricultural measures is very complex and requires considerable local expert knowledge on the spatially very diverse environmental conditions.

The invention is therefore based on the problem of improving the measurement quality and the predictive value of measurements results from a measurement device in ascertaining a plant property.

The problem on which the invention is based is solved by the subjects of the independent claims 1, 12 and 14. Preferred embodiments are to be found in the dependent claims and in the present description.

A first subject of the present invention is thus a method comprising the steps:
  moving a measurement device through or over a field in which useful plants are being grown, wherein the measurement device comprises a sensor and a position determining system
  capturing raw measured values relating to a plant property of the useful plants by means of the sensor with simultaneous determination of the position of the measurement device in or over the field by means of the position determining system
  providing a digital map of the field in which subarea-specific values for at least one property of the field are recorded
  identifying the value/values of the digital map corresponding to a captured raw measured value with reference to the position
  ascertaining a calibrated or corrected value for the plant property from the captured raw measured value and the corresponding value/values of the digital map.

A further subject of the present invention is a system comprising
  a measurement device with a sensor and a position determining system, wherein the measurement device is designed such that it moves over or through a field in which useful plants are being grown, during this receives raw measured values relating to a plant property of the useful plants and simultaneously determines the position of the measurement device in or over the field by means of the position determining system
  a memory unit, in which a digital map of the field is stored, where subarea-specific values for at least one property of the field are recorded in the digital map, and
  a computer unit, which is configured such that it
    receives a raw measured value from the measurement device together with the coordinates of the position at which the measurement device was located at the time of the capture of the raw measured value
    identifies the value of the digital map corresponding to the raw measured value, and
    from the raw measured value and the corresponding value of the digital map calculates a calibrated or corrected value for the plant property.

A further subject of the present invention is a computer program product comprising a machine-readable data storage device and program code which is stored on the data storage device, and which on execution on a computer causes the computer to
  receive from a measurement device a raw measured value relating to a plant property of a useful plant in a field and the coordinates of that position in or over the field at which the measurement device was located at the time of the capture of the raw measured value by means of a sensor, identify a value of a property of the field corresponding to the raw measured value from a digital map of the field, and calculate a calibrated or corrected value for the plant property from the raw measured value and the corresponding value of a property of the field.

The invention is described in more detail below, without distinguishing between the subjects of the invention (method, system, computer program product). Rather, the following explanations are intended to apply for all subjects of the invention in analogous manner, irrespective of in what context (method, system, computer program product) they take place.

In the method according to the invention, a measurement device is being moved through or over a field in which useful plants are grown.

The term "field" is understood to mean a spatially definable area of the earth's surface which is utilized agriculturally, in that useful plants are planted on such a field, supplied with nutrients and harvested.

The term "useful plant" is understood to mean a plant which through the involvement of humans is deliberately grown as a useful or ornamental plant. A term synonymous with the term "useful plant" is the term "cultivated plant".

The measurement device has a position determining system which makes it possible to determine the current position of the measurement device in or over the field. The position determining system is preferably a satellite-based position determining system. The Global Positioning System (GPS for short, officially NAVSTAR GPS) is a global satellite-based position determining system.

The measurement device further has one or more sensors with which raw measured values relating to a plant property of the useful plants grown in the field can be captured. When in this description and the claims "a sensor" or "the sensor" is mentioned, this should not be understood as limiting but always be interpreted such that there can also be several sensors. The same also applies in particular for terms such as "raw measured value", "plant property", "value" and "property of a/the field".

Preferably the sensor operates contactless.

In the method according to the invention, a raw measured value (or several raw measured values) relating to a plant property is ascertained by means of the sensor.

Here, the plant property can relate directly to the useful plant, such as for example the variety, the height of the useful plant or the grain or straw moisture content. It can however also relate to environmental conditions or influencing factors which can influence the growth, the health and/or the possible yield of the useful plant. As an example of environmental conditions or influencing quantities, the soil moisture content or a weed infestation can be mentioned. All these direct properties or the environmental conditions/influencing factors are intended to be covered below by the term "Plant property".

Preferably, the plant property is a property of the useful plant itself.

A first example of a plan property is the variety of the useful plant such as for example wheat, rye, barley, oats or maize. The plant property can also relate to the growth stage of the useful plant. Further examples of plant properties are: a stress level caused by other nutrients and their phenotypic signs, water stress or residual growth potential, sunscald due to UV-B exposure, expected photosynthetic/metabolic activity in the next 48 hrs (or in the next x hours), leaf angle or crop height.

As already stated above, the plant property comprises not only the properties directly affecting the useful plant, but also boundary conditions or environmental factors which can have an effect on the state of development or the future development of the useful plant (for example with regard to yield). Examples of such indirect properties are weed species present, the growth stage of weed species present, hatching time of pests (southern slope earlier than northern slope) or residual protection by pesticides from previous applications.

In a preferred embodiment of the present invention, the plant property is the nitrogen content of the useful plant.

In a particularly preferred embodiment, the plant property is the total nitrogen content of the useful plant including the nitrogen content (still) present in the soil.

In a further preferred embodiment, the plant property the growth stage of the useful plant.

In a further preferred embodiment, the plant property is a measure of the quantity (e.g. the weight) of the harvested useful plant.

In a further preferred embodiment, the plant property is the growth stage of a weed.

In a further preferred embodiment, the plant property is a measure of the quantity of a weed that is present.

The measurement device can have a contactless sensor, which for example can be designed as an optical sensor like the Yara N sensor described above or the H sensor. The optical sensor here can be a passive sensor, which operates with daylight. In that case, the sensor can measure the direct insolation, so that the different measurement results due to different light conditions can be correctly categorized. The sensor can also operate with artificial light, which extends its use times also to the hours of night. Optical sensors is also intended to include the sensors which do not operate in the visible wavelength ranges such as for example an NIR sensor. The NIR sensor operates in the range of the short wavelength infrared light and can be used for the moisture measurement of the useful plant.

In another implementation, the sensor operates according to the induction principle with electromagnetic waves.

An example of this is the EM 38 soil scanner from the Canadian manufacturer Geonics.

The measurement device can comprise a sensor for the actually harvested useful plant. For example, the weight of the harvested grain can thus be measured, whereby a plant growth model for example yields data for the grain moisture content. From the weight of the harvested grain and the grain moisture content, a calibrated grain weight, normalized to a defined grain moisture content, can then be ascertained.

The sensor is preferably attached on a field machine, which for example can be an application machine for pesticides or nutrients (for example a field sprayer, dung spreader, lime spreader, or manure spreader), a soil cultivation device, a sowing machine or a planting machine. Here field machine is understood to mean a unit which can also be made up of a tractor and a trailer/attachment.

The sensor can also be installed on a satellite for remote sensing. For example, on the basis of satellite data, a vegetation index (for example NDVI) can be calculated georeferenced, from which the biomass on the field can be derived. Such data on the vegetation can on the one hand serve as the basis for other plant properties which cannot be captured via remote sensing. On the other hand, the remote sensing data can be used to verify certain assumptions in the modeling of the plant growth and to modify these appropriately. Furthermore, it is possible that the moisture content of the soil is also measured via remote sensing. In this, the soil moisture content can be taken into account in the calculation of the water content of the soil.

The use of aircraft (unpiloted (drones) or piloted) for the capture of raw measured values is also possible.

While the measurement device is moved (or moves itself autonomously) through or over the field, raw measured values relating to a plant property are captured by means of the sensor. Simultaneously, the particular position at which the measurement device is located at the time of capture of a raw measured value is determined. Preferably, the raw measured values are stored in a memory unit for digital data together with the coordinates of the particular position.

In a further step of the method according to the invention, a digital map of the field is provided.

The term "digital" means that the map can be processed by a machine, as a rule a computer. "Processing" is understood to mean the known methods for electronic data processing (EDP).

In the digital map, values for a property of the field are recorded. The digital map is subarea-specific, i.e. it is divided up into a large number of subareas and each subarea has a value for a property of the field specific for the subarea.

The values of the digital map are also described in this description as "external data" or also as "offline data".

The external data relate to one or more properties of the field. The term "properties of the field" is to be understood broadly. It includes for example properties of the soil such as for example nitrogen content and moisture, properties of the useful plants grown on the field, yield data from the past, modeled values on plant growth, nature and quantity of pesticides and/or nutrients applied on the field in the past and the like.

The external data or offline data should be data which do not directly result from the measured values from the measurement device. The source of these external data can accordingly be of diverse nature. For example, they can be data which are known from the past for the useful plant and/or the field (for example the yield of the recent years) or which have been entered for the current growth period (for example the species of the cereal variety sown). Also, for example, to return to the above example with the N sensor, it can be the time and the quantity of a first nitrogen application. Thus with the external data a definite picture relating to the useful plant and the parameters for the useful plant can be drawn, where however in the process the current measured values from the measurement device (online data) are not taken into account in this. The invention provides for increasing the relevance and the significance of the online data by the appropriate inclusion of offline data.

As described, external data are georeferenced data. For example, the field can be subdivided into a large number of area elements (subareas), wherein specific data are available for the individual area elements (subareas). These georeferenced data can be available in the form of digital maps of high spatial resolution of for example 100×100 m, 50×50 m or 5×5 m. Such a digital map can for example for each area element show the quantity of nitrogen which was applied onto the field on a certain day. The data for such a map can be recorded by means of an application device which depending on the location records and saves the quantity of nitrogen dispensed. Also, only one qualitative class, for example "1, 2, 3 or 4" or "very small, small, medium, large, very large" as regards the plant property can assigned to each area element.

The external data can be results from a plant growth model, which preferably models at least one property of the field for a time at which the measurement device ascertains the raw measured value for the plant property. Thus for example the plant growth model can model the nitrogen content in the soil, wherein for this modeling nitrogen applications already performed and the growth of the useful plant can be taken into account.

The term "plant growth model" is understood to mean a mathematical model which describes the growth of a plant (preferably the useful plant being grown) as a function of intrinsic (genetic) and extrinsic (environmental) factors.

Plant growth models exist for a large number of useful plants.

An introduction to the creation of plant growth models is provided for example by the books i) "Mathematische Modelbildung and Simulation" [Mathematical modeling and simulation] by Marco Günther and Kai Velten, published in the Wiley VCH Verlag in October 2014 (ISBN: 978-3-527-41217-4) and ii) "Working with dynamic crop models" by Daniel Wallach, David Makowski, James W. Jones and Francois Brun, published in 2014 in the Academic Press (Elsevier), USA.

The plant growth model usually simulates the growth of a crop of useful plants over a defined period. It is also possible to use a model on the basis of a single plant, which simulates the energy and material flows in the individual organs of the plant. Mixed models are also usable.

Apart from the genetic features of the plant, the growth of a useful plant is predominantly determined by the local weather conditions prevailing over the lifetime of the plant (quantity and spectral distribution of the incident solar radiation, temperature variations, precipitation volumes, wind exposure), the condition of the soil and the nutrient supply.

The cultivation measures already taken and any infestation by pests that may have occurred can also have an influence on the plant growth and can be included in the growth model.

The plant growth models are as a rule so-called dynamic process-based models (see "Working with dynamic crop models" by Daniel Wallach, David Makowski, James W. Jones and Francois Brun, published in 2014 in the Academic Press (Elsevier), USA), but can also be entirely or partly rule-based or statistical or data-based/empirical. The models are as a rule so-called point models. In these, the models are as a rule calibrated such that the output reflects the spatial representation of the input. If the input at one point in the space is ascertained or is interpolated or estimated for one point in the space, then as a rule it is assumed that the model output is valid for the entire adjacent field. An application of so-called point models calibrated at the field level to further, as a rule, coarser scales is known (Hofmann et al. 2016). An application of these so-called point models to several points within a field thereby enables a subarea-specific modeling.

Examples of dynamic, process-based plant growth models are Apsim, Lintul, Epic, Hermes, Monica, STICS inter alia. A comparison of the models and corresponding literature on the models can for example be obtained from the following publication and the references listed therein: Hoffmann H, Zhao G, Asseng S, Bindi M, Biernath C, Constantin J, Coucheney E, Dechow R, Doro L, Eckersten H, Gaiser T, Grosz B, Heinlein F, Kassie B T, Kersebaum K-C, Klein C, Kuhnert M, Lewan E, Moriondo M, Nendel C, Priesack E, Raynal H, Roggero P P, Rötter R P, Siebert S, Specka X, Tao F, Teixeira E, Trombi G, Wallach D, Weihermüller L, Yeluripati J, Ewert F. 2016. Impact of spatial soil and climate input data aggregation on regional yield simulations. PLoS ONE 11(4): e151782, doi:10.1371/journal.pone.0151782.

Preferably one or more of the following parameters flow (input) into the modeling:

a) weather: daily precipitation totals, insolation totals, daily minimum and maximum air temperature and temperature close to soil and soil temperature, wind speed, inter alia.
b) soil: soil type, soil texture, soil nature, field capacity, permanent wilting point, organic carbon, inorganic nitrogen content, bulk density, Van Genuchten parameters, inter alia.
c) Crop plant: species, variety, variety-specific parameters such as for example specific leaf area index, temperature totals, maximal root depth, inter alia.
d) Cultivation measures: seed, sowing date, sowing density, sowing depth, fertilizer, fertilizer weight, number of fertilizer dates, fertilizer date, soil cultivation, harvest residues, crop rotation, distance to field of the same crop in the previous year, irrigation, inter alia.

In one practical example, meteorological data which can have an effect on the value or the intensity of the plant property are used in the plant growth model. For example, the air temperature, the atmospheric humidity, the hours of sunlight and/or precipitation volumes can be taken into account—preferably at high spatial resolution. These quantities on the one hand have a decisive effect on the growth of the useful plant and thus influence a large number of plant properties. On the other hand, they can also have a direct effect on certain plant properties such as for example the straw moisture content.

In the method according to the invention, soil data which have an effect on the growth of the useful plant can also be used. For example, the water content of the soil can be calculated for an area element of the field at different time-points in the growth period. On the basis of this value, the plant growth model can then model the quantity of water which the useful plant draws from the soil. The water content of the soil, preferably also here represented in high spatial resolution for individual area elements, can at the same time also be calculated taking account of the meteorological data.

In a further step of the method according to the invention, values of the digital map of the field corresponding to the captured raw measured values are identified. In the process, the raw measured values are linked with the corresponding values of the digital map via the respective positions (geocoordinates). The determination of the position takes place in the case of capture of the raw measured values by means of the position determining system. The digital map has corresponding data information (geocoordinates) available.

The assignment of a raw measured value to a value (or several values) of the digital map is thus preferably effected on the basis of the geocoordinates.

In a further step of the method according to the invention, a calibrated or corrected value for the plant property is ascertained from the captured raw measured value and the corresponding value from the digital map.

Thus according to the invention, the external data which are saved in a memory unit are used to ascertain a calibrated or corrected value for the plant property on the basis of the raw measured value.

The external data can also be described as offline data which are used for the calibration of online data (here raw measured values). In other words, in one embodiment of the present invention the offline data are used for the parameterization of the measurement device, so that the measured values are more precise or the correct conclusions relating to one or more plant properties can be drawn from these values.

The measured values from the measurement device can for example be adjusted on the basis of data from a plant growth model. From this adjustment, the measured values can be calibrated or better interpreted. For example, if the measurement device detects certain spectral abnormalities of the useful plant, which can point both to one plant disease A and also to another plant disease B, by means of the plant growth model on the basis of the previous growth and the plant properties established from this, the probability car be estimated as to whether this is more likely plant disease A or plant disease B. If for example the useful plant has had an extremely moist past, which can be portrayed via meteorological data in the plant growth model, this could make the plant disease A considerably more probable than plant disease B. Possibly even, by means of the plant growth model both diseases could be classified as improbable in spite of measured abnormalities, since an unusual drought is the cause of the measured abnormalities. Thus the plant growth model can help to interpret the (raw) measured values from the measurement device correctly.

Depending on data resolution, heterogeneity of the field and/or intensity of production, the plant growth model can model values which relate to an entire field or only for very small area units such as a pixel of 1×1 m, so that different results can emerge in high spatial resolution. It can also be provided that for example depending on the place, different plant growth models or special modules of the plant growth model come into use, if for certain areas an especially differentiated consideration/modeling appears necessary.

If now through the measurement device, which can contain the N sensor described above, for example through the reflective behavior of the useful plant its nitrogen content is ascertained, the external data from the memory unit can be used in a first step for the calibration of the N sensor. The external data can relate to the variety of the useful plant and/or also the properties of the plant crop which have an influence on the relationship between the reflective behavior and the nitrogen content in the plant. The calibration can in one implementation be exclusively based on the external data from the memory unit or in another implementation be considered at least in the calibration on the field. The measured value from the N sensor without consideration of the external data can be regarded as a raw measured value.

In a second step, the (pre-)calibrated raw measured value can be further refined to the extent that information about the nitrogen content of the soil is also taken into account via the external data. Based on the raw measured value and the first calibration (nitrogen content in the plant) and the second calibration (nitrogen content in the soil), a measured value for the total nitrogen content including the soil nitrogen can then be ascertained. With regards to the decision as to what additional quantity of nitrogen the useful plant needs for its further growth, such a measured value offers a much better basis than a measured value without use of the external data.

The digital map of the field with the values of one or more properties of the field (external data) are present in a memory unit which can be accessed by the measurement device.

In one practical example, the memory unit is designed as an external memory unit for example in the form of a server, which the measurement device can access or which is in communication with the measurement device. For example, it can be a web-based platform on which a user logs in with the measurement device before the start of the measurement and thus has access to the external data or offline data of the server. Depending on the instantaneous position of the measurement device or a corresponding input of the field to be processed, the external data which are of relevance for the parameterization of the sensor being used can be delivered via the platform. Possibly, the plant growth model which at a certain spatial resolution calculates certain plant properties for the time-point of the measurement taking account of current weather data is first started through the logging in. Even if these data are only calculated on request, these should be said external data or offline data, since they are independent of the current measurement results. It can also be provided that through the operation of the measurement device the external data are automatically requested or ascertained.

The connection between the external memory unit and the measurement device is preferably effected wirelessly, for example via the internet. In principle, it is also possible that a transportable storage medium such as a USB stick, on which the external data are stored, is attached to the measurement device. The external data on the storage medium can then also relate to a time-point which somewhat corresponds to the time-point of the measurement.

In one practical example, the value of the plant property ascertained by the measurement unit taking account of the external data is used for the control of an agricultural actuator. The agricultural actuator can for example be a pump of a field sprayer through which a pesticide in liquid form is applied onto the field. Here the measurement device firstly ascertains the raw measured value for a certain plant property, which is then corrected or calibrated taking account of the external data. The pump can then be controlled on the basis of the corrected or calibrated measured value. When for example a high level of weed is detected by the measurement device for a certain area element, the pressure in the pump of the field sprayer is correspondingly increased, as a result of which a larger volume of herbicides is applied for this area element. If on the other hand the measured value corrected/calibrated by the external data indicates little or no weed, then for the area element concerned the pressure of the pump can be reduced or set to zero. Another possibility for influencing the quantity applied consists in variation of nozzle cross-section. The smaller the nozzle cross-section, the less liquid is applied onto the field.

A further possibility for variable dosing in case of a field sprayer consists in varying the ratio of water and the pesticide or fertilizer used. With area elements which according to the corrected measurement value require little pesticide or fertilizer, the proportion thereof in the mixture is reduced. Also the droplet size of the agent to be applied, which can be adjusted via the application pressure and/or through the provision of a compressed air flow, can be varied depending on the corrected measured value.

Possible variations in a sowing machine in order to be able to react to unusual soil conditions are obtained for example through differentiated dispensing of a dressing with which the seed is coated, different sowing depths or different sowing distances.

Depending on corrected measurement values from the measurement device at a certain spatial resolution, a drone can also be controlled, which then follows a defined flight pattern and thereby depending on the instantaneous location releases a metered quantity of pesticide or fertilizer.

The invention will be explained in more detail on the basis of a practical example. Nitrogen is to be applied onto a field through use of a field sprayer. For the online capture of the nitrogen content of the useful plant or the plant crop on the field, the field sprayer has an N sensor. Before the application begins, a connection between the field sprayer and a central server is made by logging in on a web-based platform. After inputting of the spatial coordinates of the field or of data which unambiguously identify the field, the server provides external data or offline data which describe several plant properties of the useful plant on the field. The data here are based on results from a plant growth model which models a large number of plant properties of the useful plant for the current time-point. The current weather and in addition the probable development of the weather can also be provided if the plant growth model has an appropriate weather prediction module.

On the basis of the plant properties communicated (for example cereal variety, biomass crop), the N sensor is parameterized so that a comparatively good estimate of the nitrogen content of the useful plant is possible. In order to calculate the necessary quantity of nitrogen or of the nitrogen carrier, data concerning the nitrogen content of the soil are also communicated to the field sprayer. These soil data relate to nitrogen applications already made in the past and the (modelled) development of the useful plant up to the current time-point. From these data, the application dosage is then calculated and, as far as possible with high spatial resolution, applied area-specifically onto the field. The calculation of the application dosage can be performed by a processor on the field sprayer. In principle, however, it is also possible that the application dosages are calculated by the server. In this case, the measurement results from the N sensor are loaded onto the server. As a response, the server then sends data relating to the application dosage. The data of the quantities to be applied and the actually applied quantities can then be saved on the server. These data then serve as the basis for the further modeling of the plant growth and can be taken into account in the next upcoming agricultural measure (for example further nitrogen application or harvesting). It goes without saying that the practical example presented here is intended also to apply by way of example for the application of pesticides or other agricultural measures.

The invention claimed is:

1. A method comprising the steps
    moving a measurement device through or over a field in which useful plants are being grown, wherein the measurement device comprises a sensor and a position determining system
    capturing raw measured values relating to a plant property of the useful plants by means of the sensor with simultaneous determination of the position of the measurement device in or over the field by means of the position determining system
    providing a digital map of the field, in which subarea-specific values for at least one property of the field are listed, wherein the values comprise external data independent of the measurement device,
    identifying the values of the digital map corresponding to the raw measured values captured with regard to the position
    ascertaining a calibrated or corrected value for the plant property from the raw measured values captured and the corresponding value/values of the digital map.

2. The method as claimed in claim 1, characterized in that the values of the digital map are the results of a plant growth model which models at least one property of the field for a time-point at which the measurement device ascertains the raw measured value for the plant property.

3. The method as claimed in claim 1, characterized in that the nitrogen content of the useful plants can be ascertained from raw measured values, while in the digital map of the field the nitrogen content of the soil is listed and the corrected values of the plant property state the total nitrogen content of the useful plant including the nitrogen content still located in the soil.

4. The method as claimed in claim 1 characterized in that a nitrogen content of the useful plants can be ascertained from raw measured values, while in the digital map of the field the growth stage of the useful plants being grown is listed and the calibrated values of the plant property state the calibrated nitrogen content of the useful plant on the basis of the growth stage present at the time.

5. The method as claimed in claim 1, characterized in that the measurement device comprises a sensor for the actually harvested useful plant.

6. The method as claimed in claim 5, characterized in that by means of the sensor the weight of the harvested grain is measured, and values for the grain moisture content are recorded in the digital map, and from the weight of the harvested grain and the grain moisture content, a calibrated grain weight, normalized to a defined grain moisture content, is ascertained.

7. The method as claimed in claim 1, characterized in that the sensor is attached on a field machine.

8. The method as claimed in claim 7, characterized in that the field machine is a harvesting machine, an application machine for pesticides or fertilizers, a sowing machine or a planting machine.

9. The method as claimed in claim 1, characterized in that the digital map of the field is stored in a memory unit which is designed in the form of a central server.

10. The method as claimed in claim 1, characterized in that the transfer of the external data is effected via a wireless connection between the measurement device and the server.

11. The method as claimed in claim 1, characterized in that the ascertained calibrated or corrected value of the plant property is used for the control of an agricultural actuator.

12. A system comprising
a measurement device with a sensor and a position determining system wherein the measurement device is designed such that it moves over or through a field in which useful plants are being grown, and thereby by means of the sensor captures raw measured values relating to a plant property of the useful plants and simultaneously determines the position of the measurement device in or over the field by means of the position determining system
a memory unit in which a digital map of the field is stored, wherein subarea-specific values for at least one property of the field are listed in the digital map, wherein the values comprise external data independent of the measurement device, and
a computer unit which is configured such that it
receives a raw measured value from the measurement device together with the coordinates of the position at which the measurement device was located at the time of the capture of the raw measured value
identifies the value of the digital map corresponding to the raw measured value, and
from the raw measured value and the corresponding value of the digital map calculates a calibrated or corrected value for the plant property.

13. The system as claimed in claim 12, further comprising an agricultural actuator, wherein the computer unit is configured such that it uses the calculated calibrated or corrected value for the plant property for the control of the agricultural actuator.

14. A computer product comprising a computer-readable data storage device and program code which is stored on the data storage device, and which on execution on a computer causes the computer to
receive from a measurement device a raw measured value relating to a plant property of a useful plant in a field and the coordinates of its position in or over the field at which the measurement device was located at the time-point of the capture of the raw measured value by means of a sensor,
identify from a digital map of the field a value of the property of the field corresponding to the raw measured value, wherein the value of the property of the field comprises external data independent of the measurement device, and
calculate a calibrated or corrected value for the plant property from the raw measured value and the corresponding value of a property of the field.

15. The computer program product as claimed in claim 14, wherein further the computer is caused to use the calculated calibrated or corrected value for the plant property for the control of an agricultural actuator.

* * * * *